US012311396B2

United States Patent

Dai et al.

(12) United States Patent
(10) Patent No.: US 12,311,396 B2
(45) Date of Patent: May 27, 2025

(54) SHOWER DEVICE

(71) Applicant: RUNNER(XIAMEN) CORP., Fuzhou (CN)

(72) Inventors: bi fu Dai, Xiamen (CN); xin zhan Hu, Xiamen (CN); wen Gao, Xiamen (CN); tao yan Zhang, Xiamen (CN); Gang Yu, Xiamen (CN); zhi liang Lin, Xiamen (CN); wei zhen Chen, Xiamen (CN); yong Lin, Xiamen (CN); lu Lu, Xiamen (CN)

(73) Assignee: RUNNER(XIAMEN) CORP., Fuzhou (CN)

( * ) Notice: Subject to any disclaimer, the term of this patent is extended or adjusted under 35 U.S.C. 154(b) by 0 days.

(21) Appl. No.: 17/565,456

(22) Filed: Dec. 30, 2021

(65) Prior Publication Data

US 2022/0219189 A1 Jul. 14, 2022

(30) Foreign Application Priority Data

Jan. 14, 2021 (CN) ......................... 202110050086.9

(51) Int. Cl.
*E03C 1/04* (2006.01)
*B05B 15/62* (2018.01)

(52) U.S. Cl.
CPC ............ *B05B 15/62* (2018.02); *E03C 1/0408* (2013.01)

(58) Field of Classification Search
CPC . E03C 1/06; B05B 1/18; B05B 15/654; F16L 27/04
See application file for complete search history.

(56) References Cited

U.S. PATENT DOCUMENTS 4,964,573 A * 10/1990 Lipski ........................ E03C 1/06 4/615
2019/0351444 A1* 11/2019 Berlovan, Jr ............. B05B 1/18
2021/0060598 A1* 3/2021 Lee ........................... E03C 1/06

* cited by examiner

*Primary Examiner* — Qingzhang Zhou
*Assistant Examiner* — Joel Zhou
(74) *Attorney, Agent, or Firm* — Jose Cherson Weissbrot

(57) ABSTRACT

The present invention discloses a shower device, comprising a shower and a base, the base is provided with a convex boss, the back of the shower 1 is provided with a groove matching the convex boss, and the base is also provided with an elastic buckle, the shower is provided with a clamping slot that can be matched and clamped with the elastic buckle, and another socket for hooking up the shower is also provided on the base. Through the design of the above-mentioned structure, the invention specifically uses the cooperation relationship between the clamping slot and the groove to form a lock position in a certain, so as to avoid the accident that the shower falls off from the base and accidentally injures the child. At the same time, a socket is arranged at the height of the side end of the base, which meets the needs of people who need high-altitude shower, and enhance diversity and flexibility.

7 Claims, 13 Drawing Sheets

SHOWER DEVICE

FIELD OF TECHNOLOGY

The present invention relates to a shower device.

BACKGROUND

At present, the magnetic connection showers on the market need to align the holes when assembling, and some are easy to separate from the base when the hose is pulled, and it is easy to hit children. At the same time, the shower cannot be placed in a high place for showering. Various shortcomings make the user experience poor.

SUMMARY

In order to solve the above technical problems, the purpose of the present invention is to provide a shower device, specifically through the structure design of the shower and the base, so that it can form a locking position in a certain direction when it is connected in conjunction, so as to prevent the accident of children pulling the hose and the shower falling and damaging. at the same time, the side end of the base is provided with additional high-level socket to meet the people who like to shower in high places.

The present invention is realized through the following technical solutions:

A shower device, comprising a shower and a base, wherein the base is provided with a convex boss, the back of the shower is provided with a groove matching the convex boss, and the base is also provided with an elastic buckle, the shower is provided with a clamping slot that can be matched and clamped with the elastic buckle, and another socket for hooking up the shower is also provided on the base.

In the embodiment of the present invention, the back of the shower is provided with a first magnetic surface, and the base is provided with a second magnetic surface that matches with the first magnetic surface.

In the embodiment of the present invention, the convex boss is arranged on the second magnetic surface, and the groove is arranged on the first magnetic surface.

In the embodiment of the present invention, a protrusion part is provided on the first magnetic surface, a depression is provided in the middle of the protrusion part, and the depression forms the clamping slot.

In the embodiment of the present invention, the upper end face of the depression is in an inclined shape that gradually expanding from the inside to the outside.

In the embodiment of the present invention, the base comprises an elastic buckle support, a sliding groove is arranged on the elastic buckle support, the elastic buckle is matched with the sliding groove, and a spring is also arranged between the elastic buckle support and the elastic buckle.

In the embodiment of the present invention, the elastic buckle is also provided with a bending part, and the bending part is matched and clamped with the clamping slot.

In the embodiment of the present invention, the elastic buckle support is also cooperatively connected with a magnet upper disk, and a second magnetic member is arranged in the magnet upper disk.

In the embodiment of the present invention, the back of the shower is provided with a depression, the depression is cooperatively connected with a magnet lower disk, the magnet lower disk is provided with a first magnetic member, and the groove and clamping slot are arranged on the magnet lower disk.

In the embodiment of the present invention, the socket is provided at the side end of the base.

In the embodiment of the present invention, the base is also matched and connected with a ball head.

The present invention has the following beneficial effects:

1. The shower is provided with a groove and a clamping slot, and the base is provided with a convex boss and an elastic buckle. the cooperation between the two is clamped in a certain direction to form a lock position, so that the shower can be stably fixed when the child pulls the hose, so as to avoid the accident that the shower falls off from the base and accidentally injures the child.
2. The shower is provided with a first magnetic surface, the base is provided with a second magnetic surface, and the first magnetic surface and the second magnetic surface are arranged so that the shower can be automatically positioned in the matching position without the need for hole positioning when the shower is matched and clamped with the base.
3. A socket is also arranged at the height of the side end of the base, which meets the needs of people who need high-altitude shower and enhances flexibility.
4. A ball head is arranged to change the diversity of water outlet direction.

BRIEF DESCRIPTION OF THE DRAWINGS

In order to illustrate the technical solution of the present invention more clearly, the following is a brief description of the accompanying drawings to be used in the description of the embodiments or prior art, and it is obvious that the following drawings are only some embodiments of the present invention, and that other drawings can be obtained from these drawings without any creative effort on the part of those of ordinary skill in the art.

Figure 1:
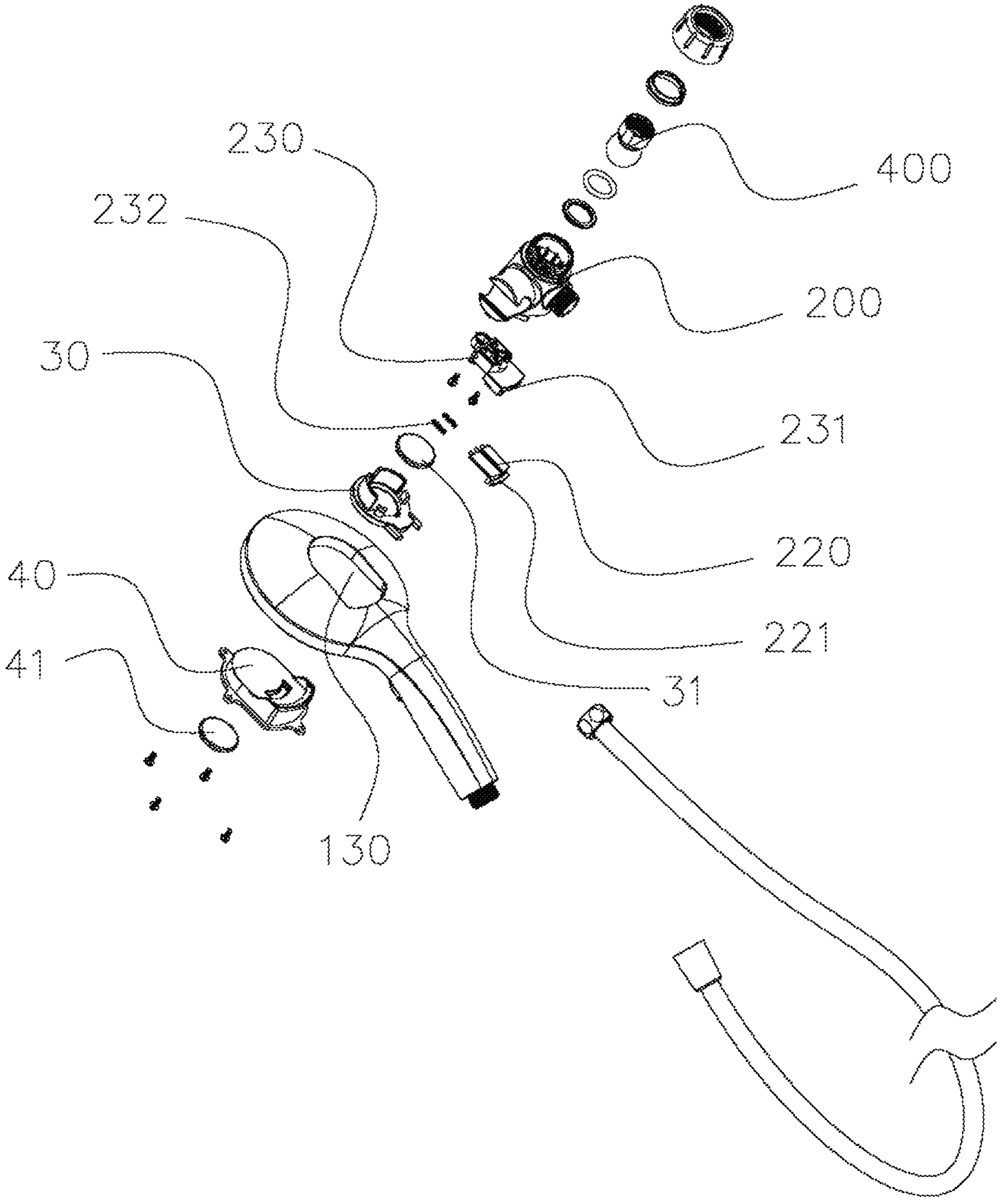
FIG. 1 is an exploded diagram of the present invention.
Figure 2:
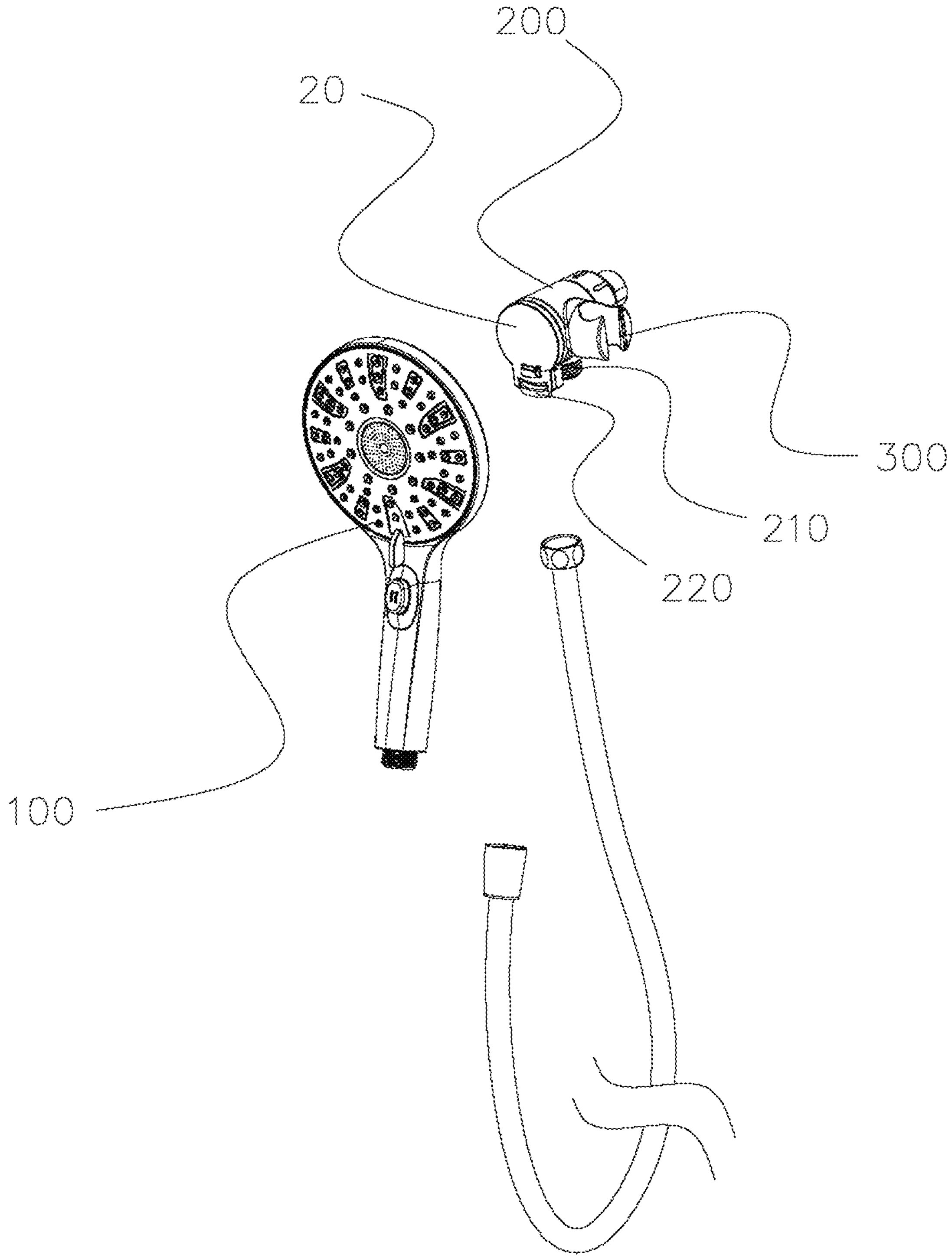
FIG. 2 is an exploded view of the present invention.
Figure 3:
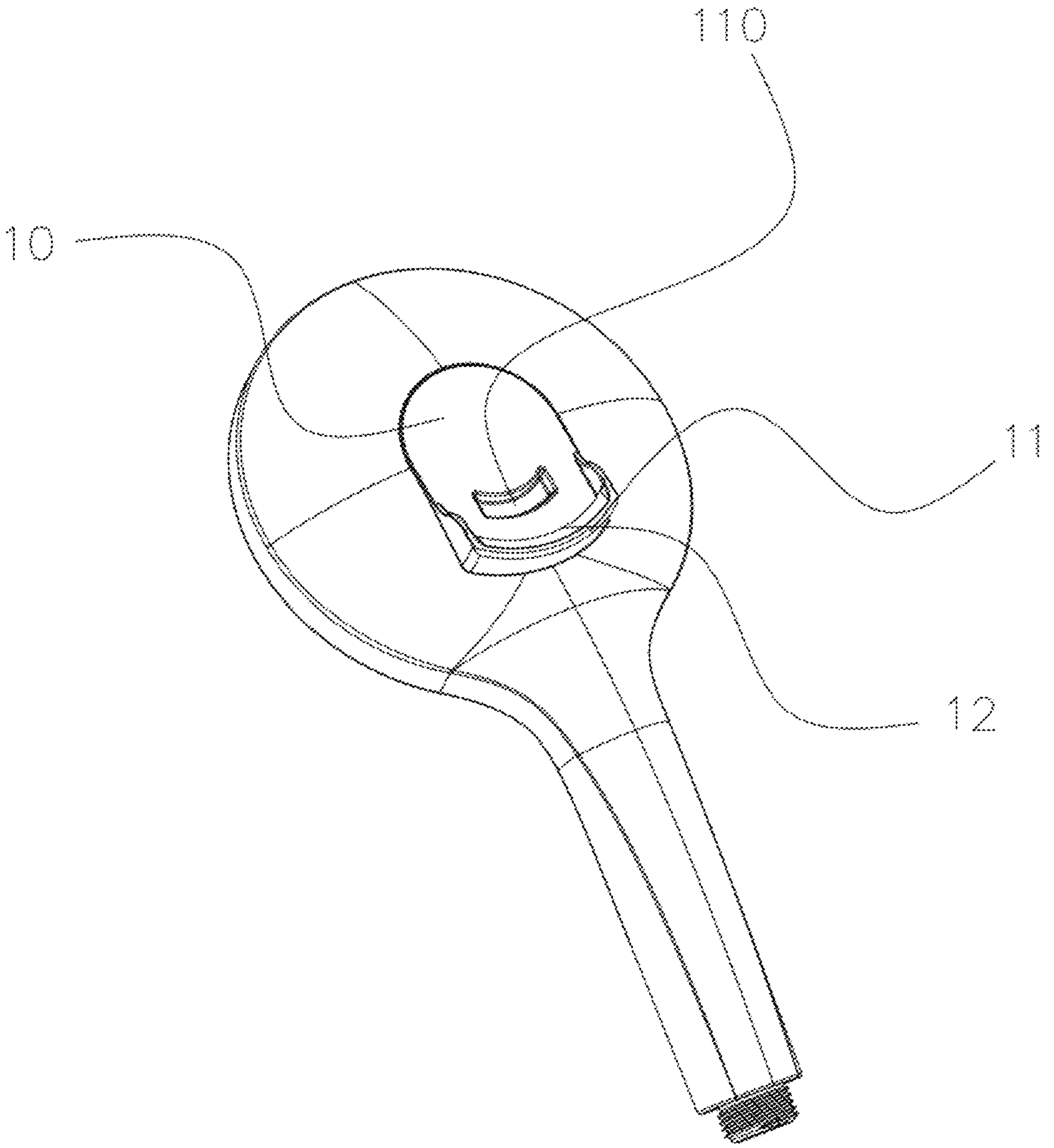
FIG. 3 is a schematic diagram of the shower of the present invention.
Figure 4:
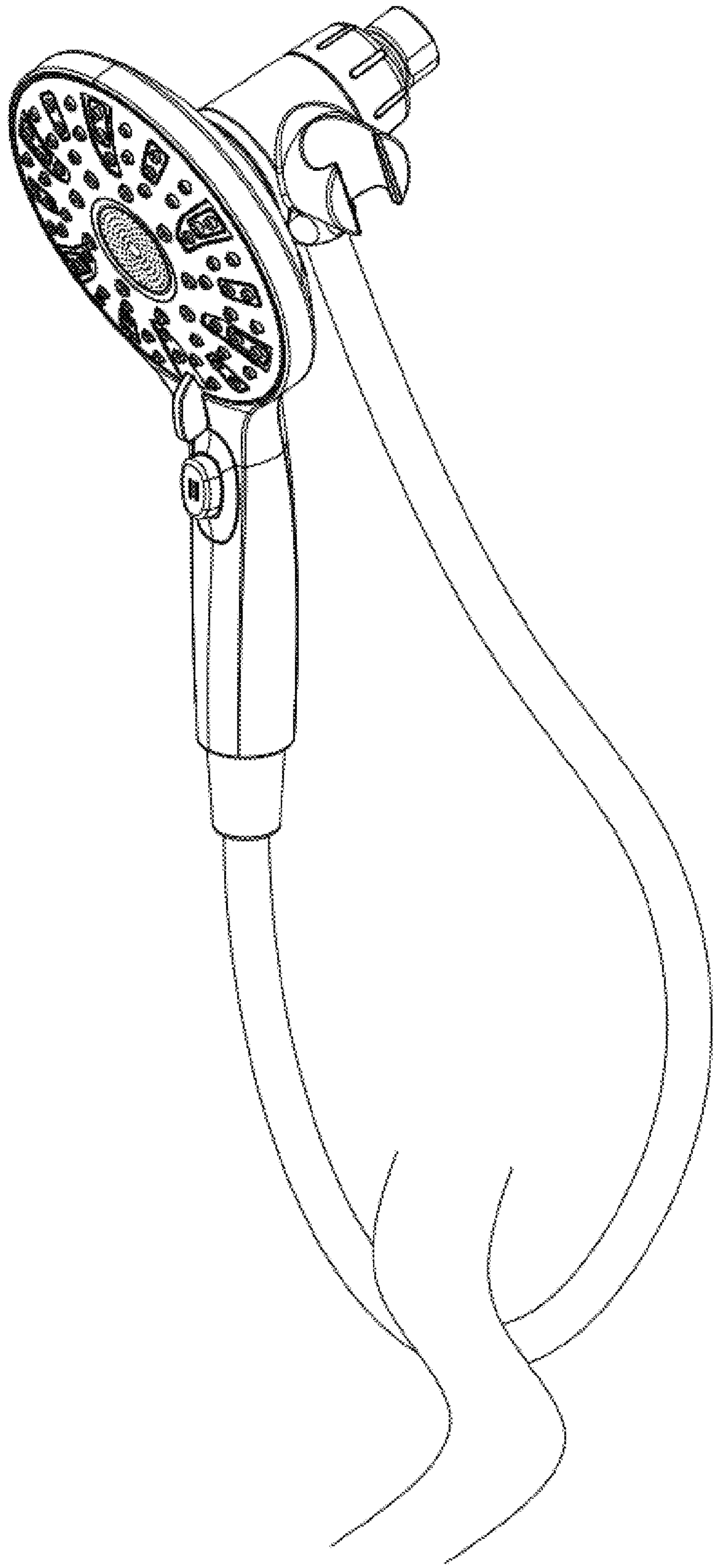
FIG. 4 is a schematic diagram of the present invention.
Figure 5:
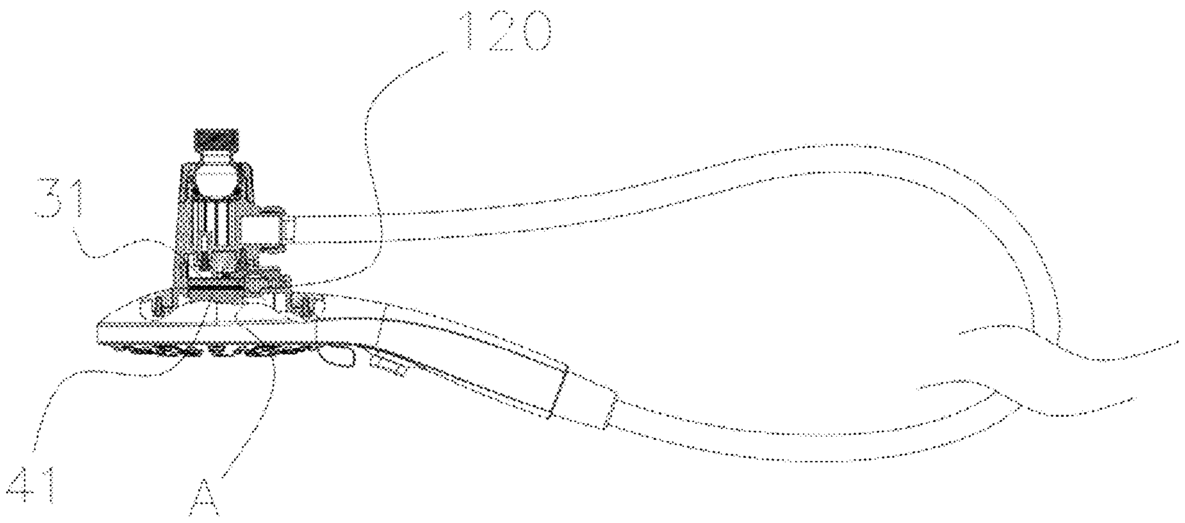
FIG. 5 is a sectional view of the present invention.
Figure 6:
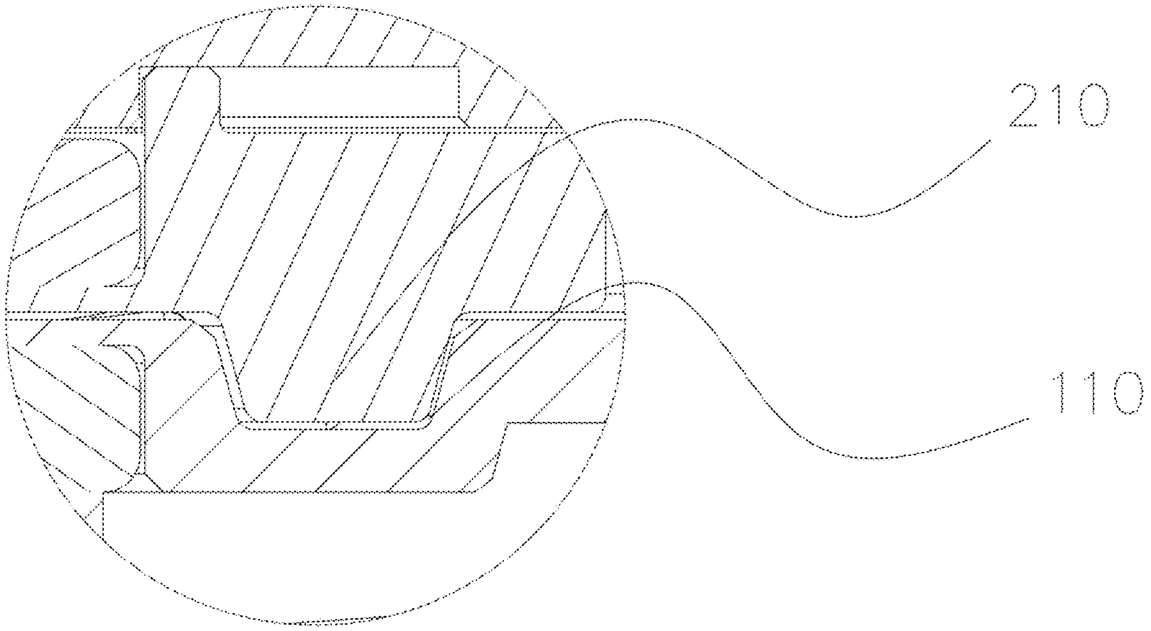
FIG. 6 is an enlarged schematic view of the present invention at A.

In the Figures: 10—first magnetic surface; 11—protrusion part; 20—second magnetic surface: 30—magnet upper disk;

31—second magnetic member; 40—magnet lower disk; 41—first magnetic member; 100—shower; 110—groove; 120—clamping slot; 130—depression; 200—base; 210—convex boss; 220—elastic buckle; 221—bending part; 230—elastic buckle support; 231—sliding groove; 232—spring; 300—socket; 400—ball Head.

DESCRIPTION OF THE EMBODIMENTS

The technical solutions in the embodiments of the invention will be clearly and completely described below in conjunction with the accompanying drawings in the embodiments of the invention, and it is clear that the described embodiments are only a part of the embodiments of the invention, and not all of them. Based on the embodiments of the present invention, all other embodiments obtained by a person of ordinary skill in the art without making creative labor fall within the scope of protection of the present invention.

Referring to the attached drawings of the specification, a shower device, comprising a shower 100 and a base 200, the base 200 is provided with a convex boss 210, the back of the shower 100 is provided with a groove 110 matching the convex boss 210, and the base 200 is also provided with an elastic buckle 220, the shower 100 is provided with a clamping slot 120 that can be matched and clamped with the elastic buckle 220, and another socket 300 for hooking up the shower is also provided on the base 200. More specifically, the base 200 comprises an elastic buckle support 230, a sliding groove 231 is arranged on the elastic buckle support 230, the elastic buckle 220 is matched with the sliding groove 231, and a spring 232 is also arranged between the elastic buckle support 230 and the elastic buckle 220. When the shower 100 is matched and clamped with the base 200, under the action of the spring 232, the elastic buckle 220 contracts to make it easy to insert, and when the shower 100 is completely matched with the base 200, the spring 232 is reset so that the elastic buckle 220 can be placed in the clamping slot 120 to form a clamping connection. Through the design of the above-mentioned structure, the present invention forms a lock position in a certain direction under the cooperation of the convex boss 210 and the groove 110 and the elastic buckle 220 and the clamping slot 120, so that the shower can be stably fixed when the child pulls the hose, so as to avoid the accident that the shower falls off from the base and accidentally injures the child. At the same time, a socket 300 is arranged at the height of the side end of the base, which meets the needs of people who need high-altitude shower and enhances flexibility.

Figure 7:
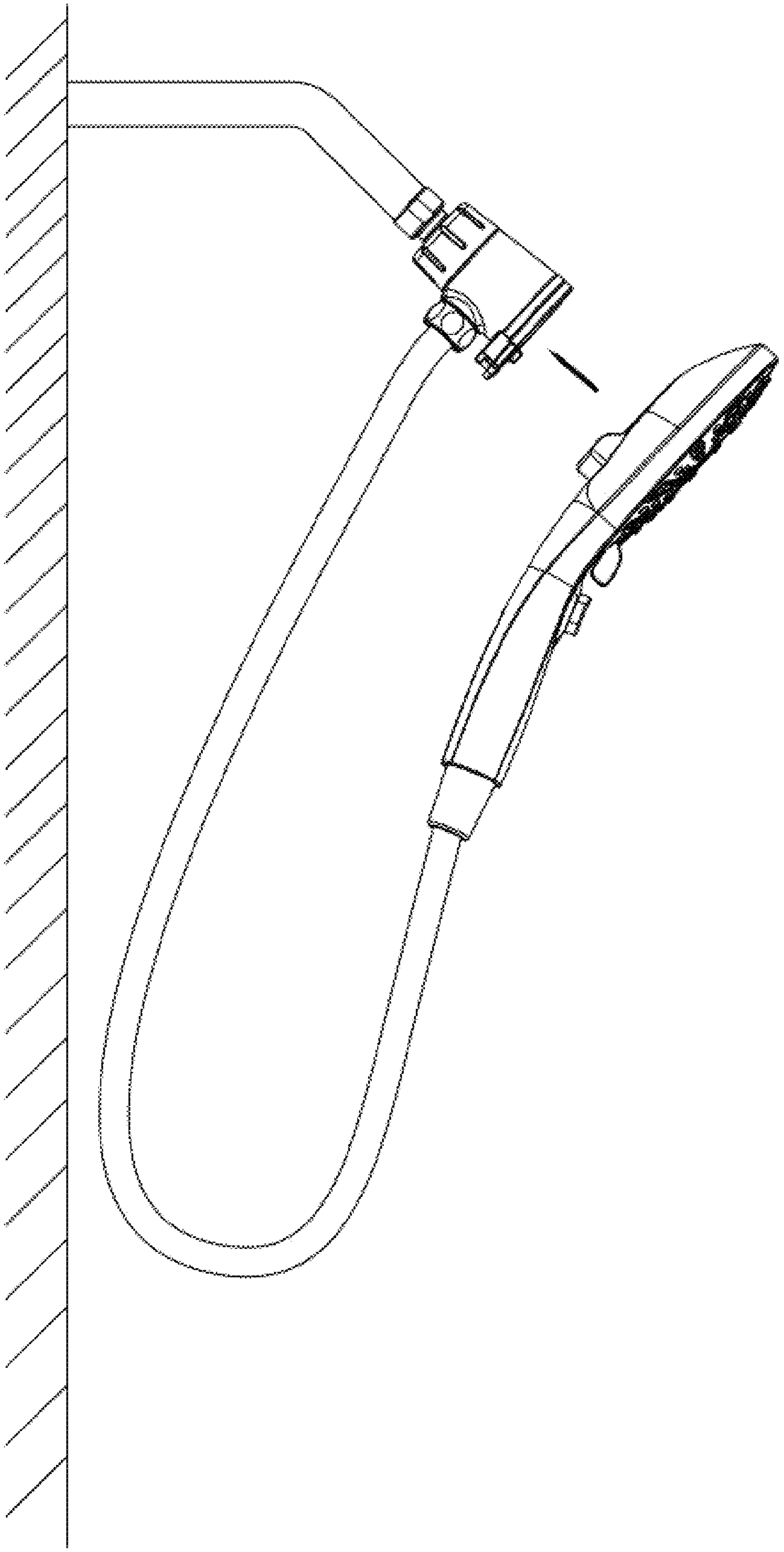
FIG. 7 is a schematic diagram of the insertion of the present invention.

Further, the back of the shower 100 is provided with a first magnetic surface 10, and the base 200 is provided with a second magnetic surface 20 that matches with the first magnetic surface 10, referring to FIG. 7 of the specification, when the first magnetic surface 10 and the second magnetic surface 20 are close to a certain range, under the action of the suction force, there is an automatic correction function, so that the shower can be automatically positioned in the matching position without the need for hole positioning when the shower is matched and clamped with the base.

Further, in the specific embodiment of the present invention, the convex boss 210 is arranged on the second magnetic surface 20, and the groove 110 is arranged on the first magnetic surface 10.

Further, a protrusion part 11 is provided on the first magnetic surface 10, a depression 12 is provided in the middle of the protrusion part 11, and the depression 12 forms the clamping slot 120.

Further, the elastic buckle 220 is also provided with a bending part 221, and the bending part 221 is matched and clamped with the clamping slot 120.

Further, the elastic buckle support 230 is also cooperatively connected with a magnet upper disk 30, and a second magnetic member 31 is arranged in the magnet upper disk 30.

Further, the back of the shower 100 is provided with a depression 130, the depression 130 is cooperatively connected with a magnet lower disk 40, the magnet lower disk 40 is provided with a first magnetic member 41, and the groove 110 and clamping slot 120 are arranged on the magnet lower disk 40.

Figure 12:
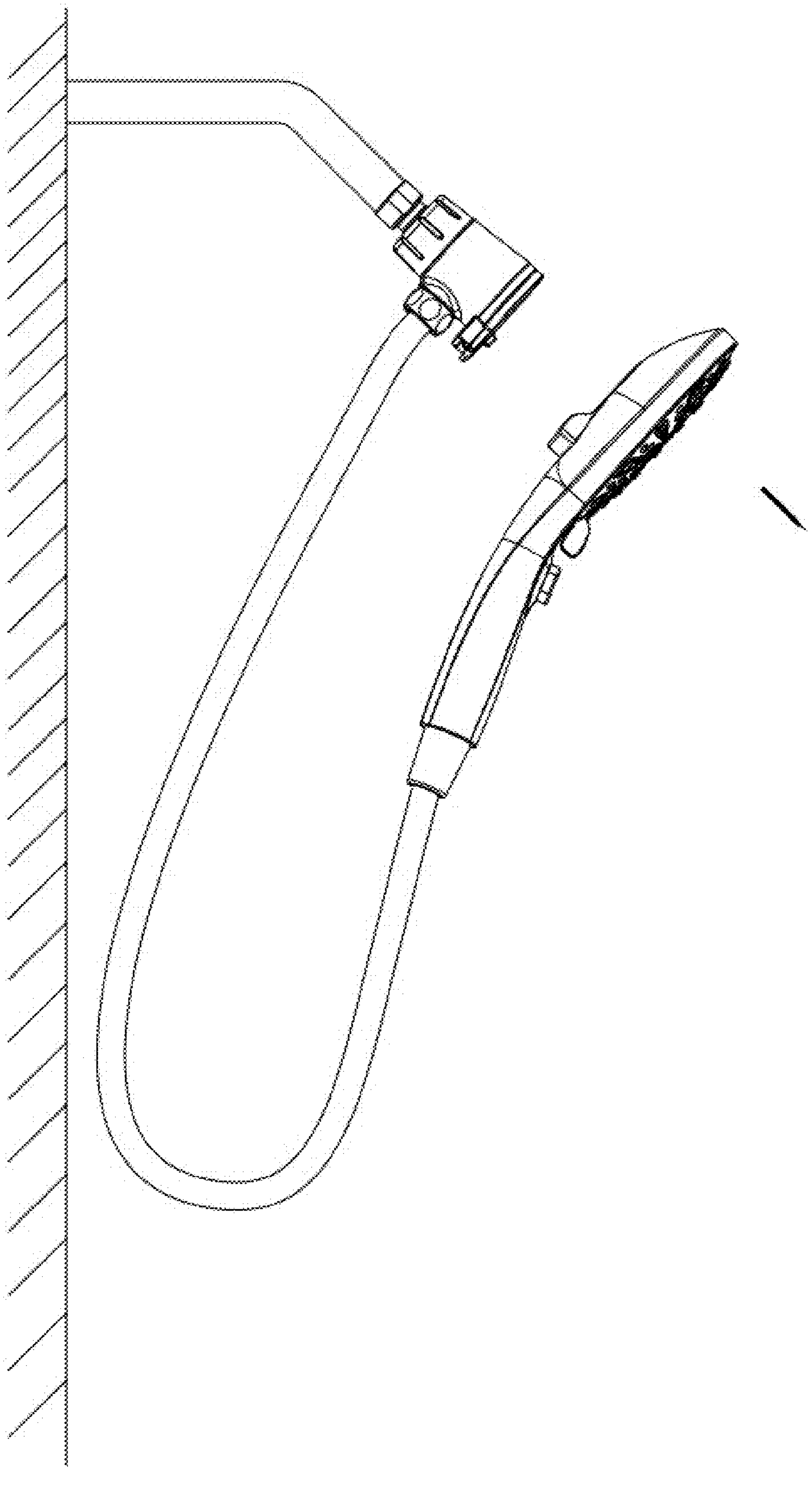
FIG. 12 is a schematic diagram 2 of the action after removing the shower in the present invention.
Figure 13:
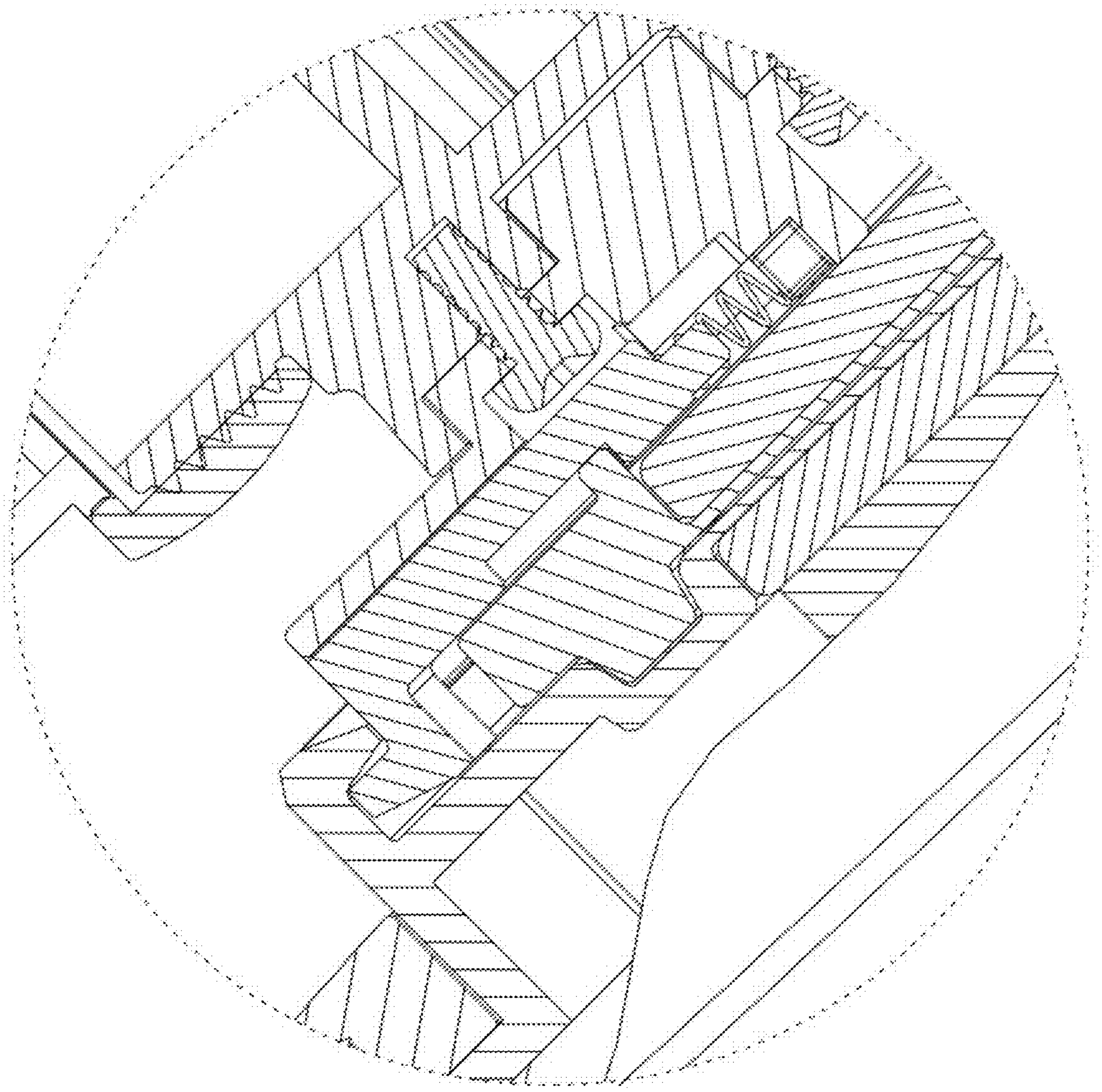
FIG. 13 is a structural diagram of realizing parallel separation between the shower and the base of the present invention.

Further, the socket 300 is provided at the side end of the base 200, which aims to add a new way of hooking, so as to meet the needs of people who need high-altitude shower, and enhance diversity and flexibility, as shown in FIG. 12 of the description.

Further, the base 200 is also matched and connected with a ball head 400, and the ball head 400 is arranged to realize the adjustment of the water outlet direction.

Figure 8:
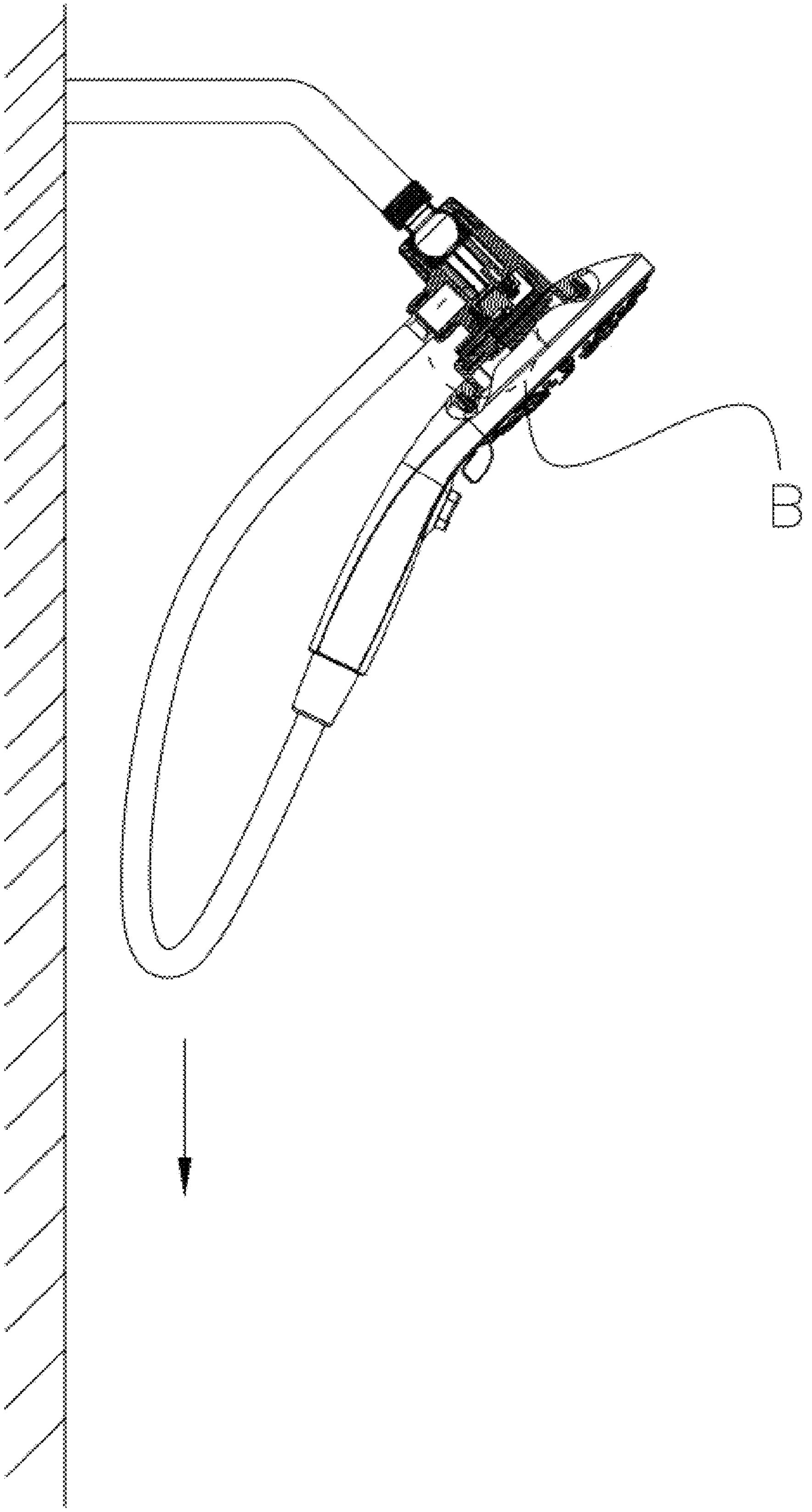
FIG. 8 is a structural diagram in which the shower does not separate from the base when pulling the hose in the present invention.
Figure 9:
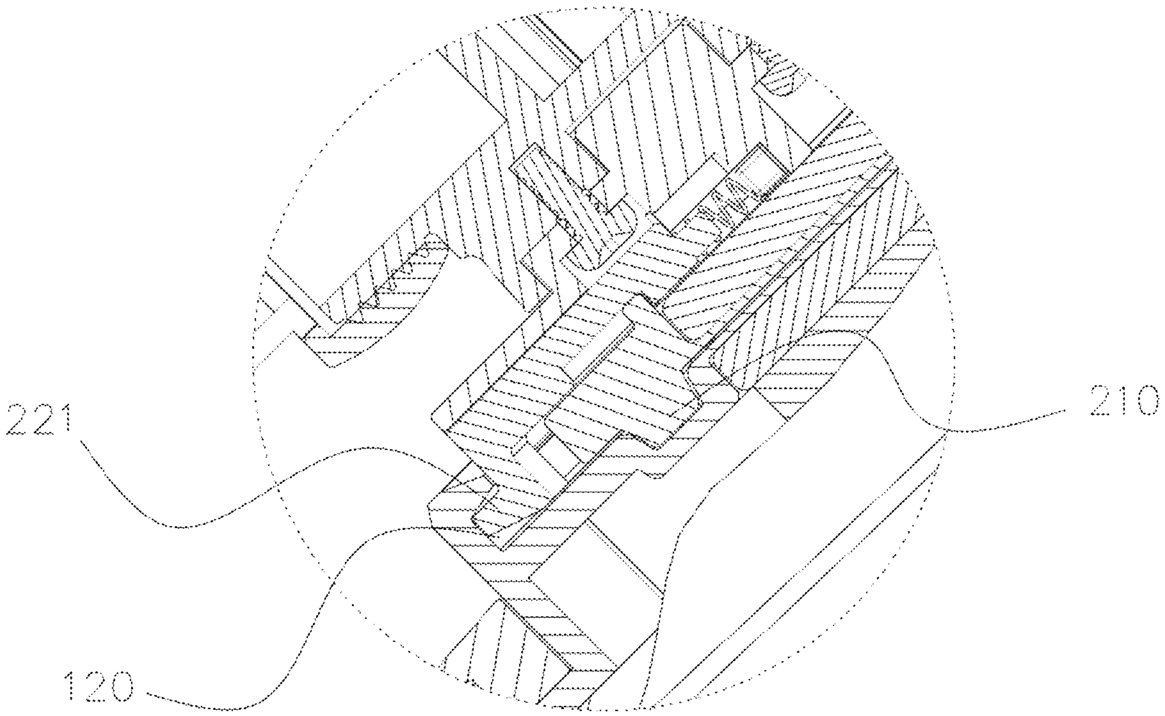
FIG. 9 is an enlarged schematic view of the present invention at B.
Figure 10:
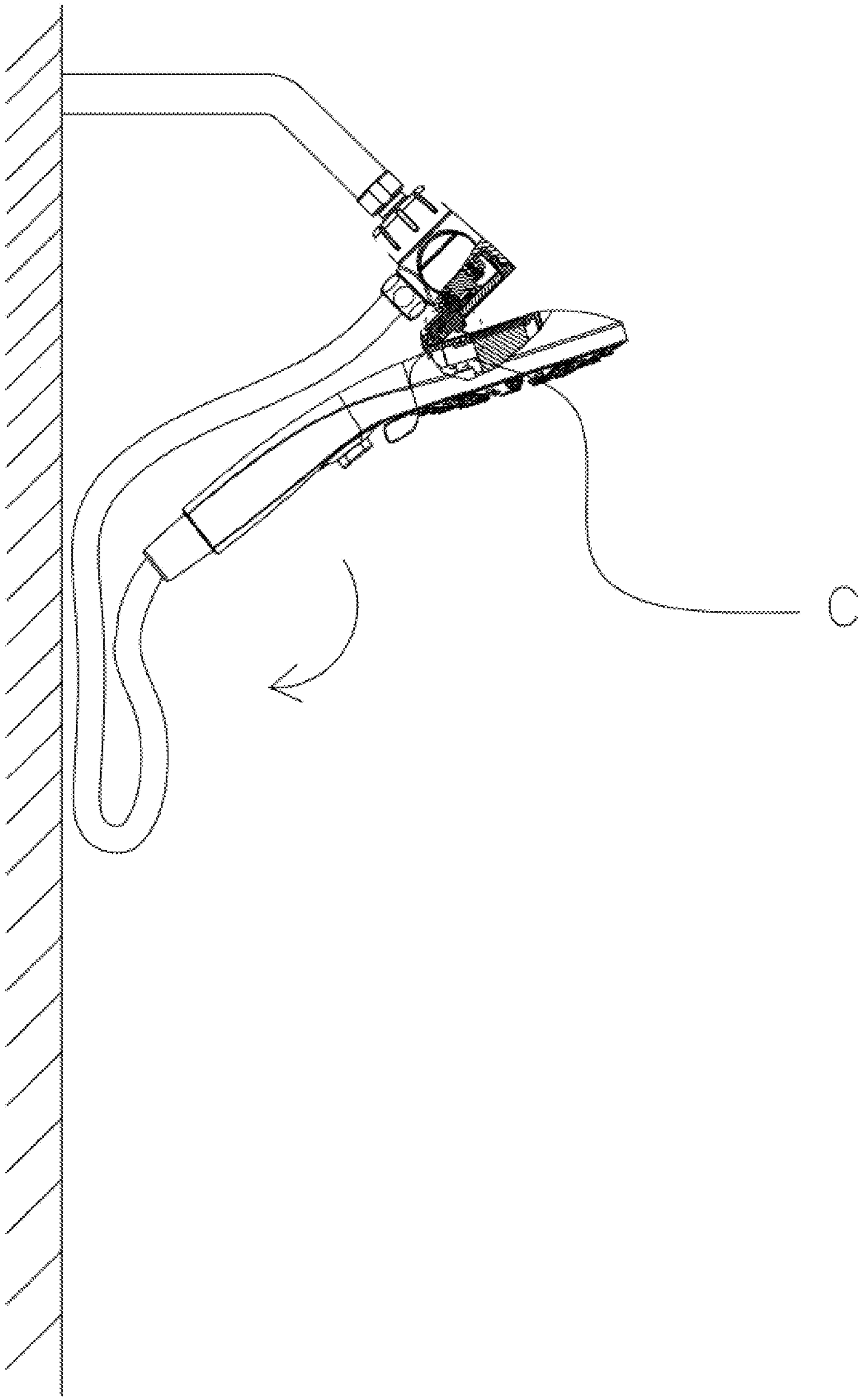
FIG. 10 is a schematic diagram 1 of the action after removing the shower in the present invention.
Figure 11:
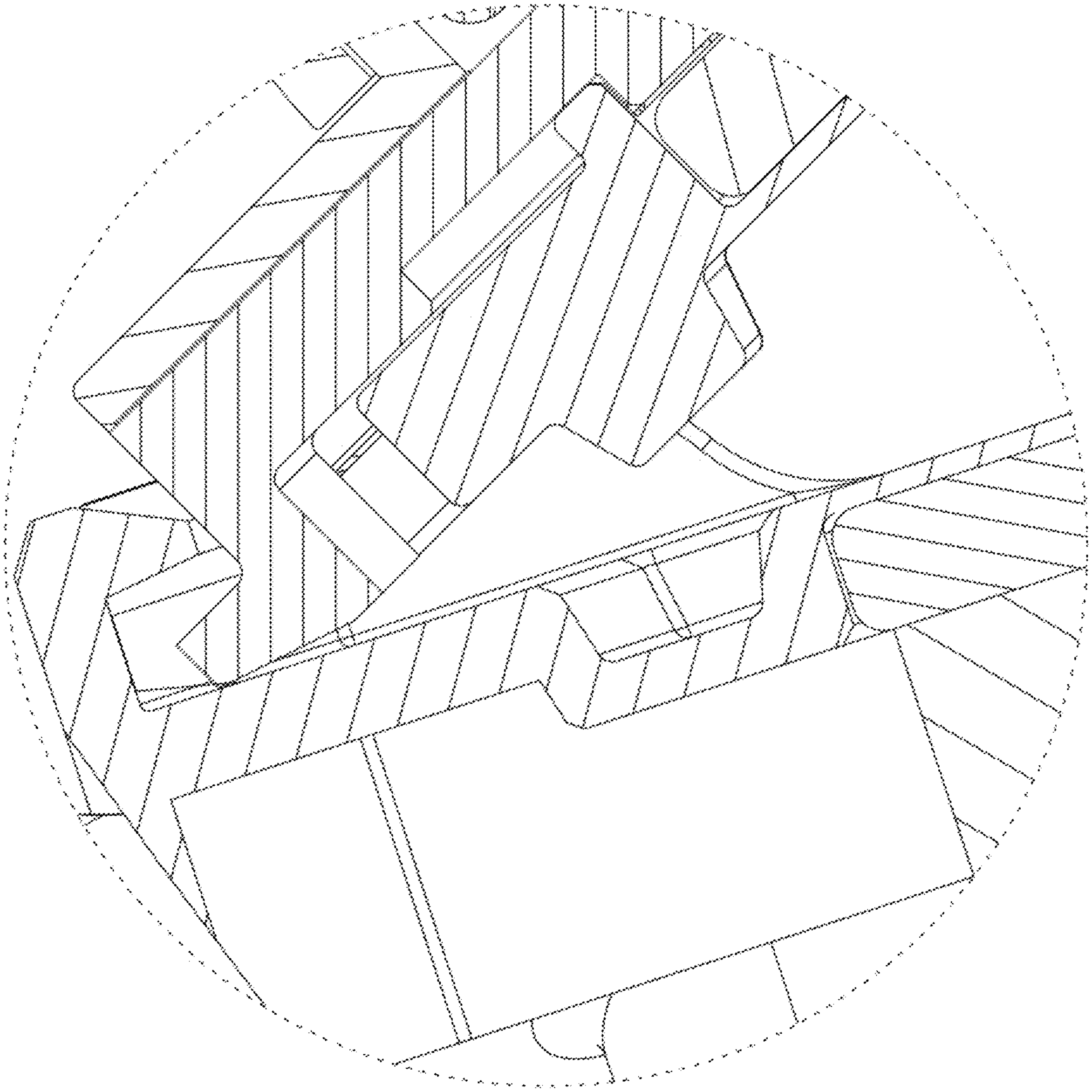
FIG. 11 is an enlarged schematic view of the present invention at C.
Figure 14:
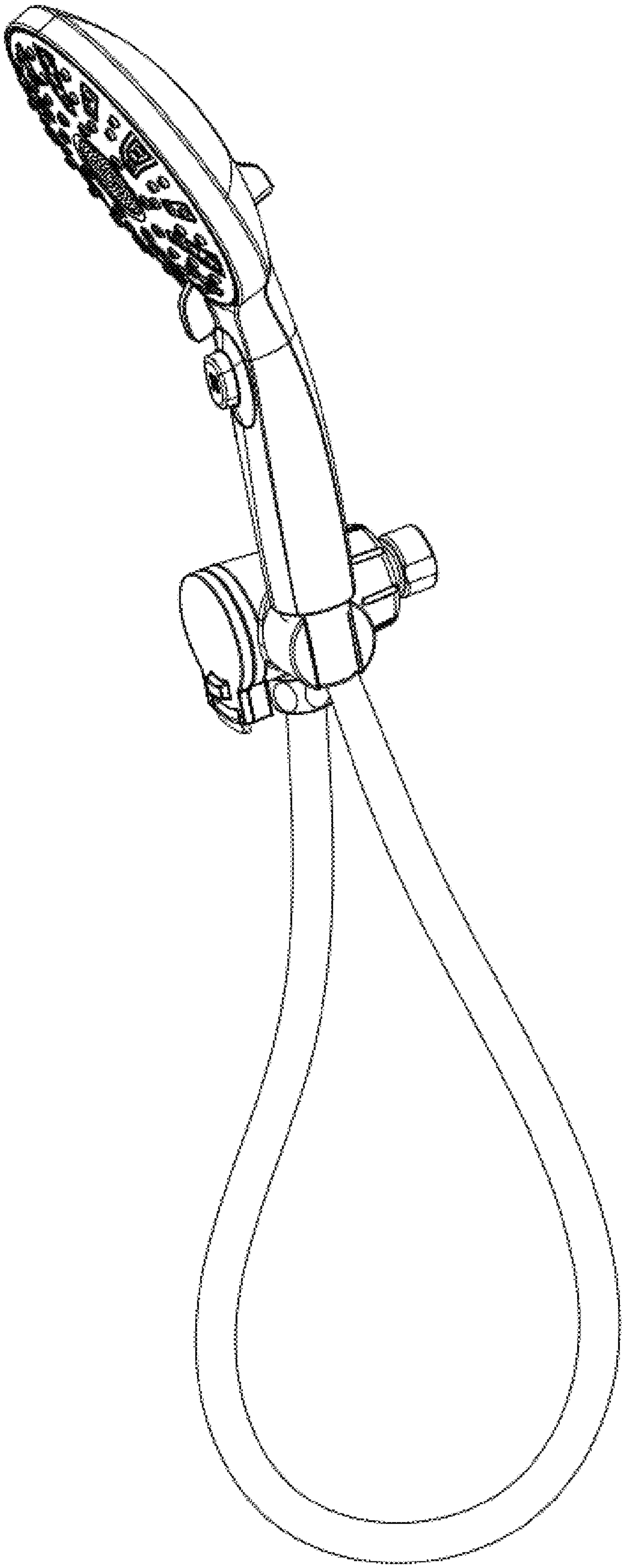
FIG. 14 is a schematic diagram in which the shower is a high-altitude shower in the present invention.

In the process of use, the shower 100 is placed close to the base 200, and due to the adsorption of the first magnetic member 41 and the second magnetic member 31, the mating position of the shower 100 and the base 200 can be automatically corrected, so the shower 100 can be placed at will and without hole alignment. When the shower 100 is completely matched and clamped with the base 200, the bending part 221 of the elastic buckle 220 is placed in the clamping groove 120, and the boss 210 on the base 200 is placed in the groove 110, which forms a lock position in a certain direction under the cooperation of the convex boss 210 and the groove 110 and the elastic buckle 220 and the clamping slot 120, so that the shower can be stably fixed when the child pulls the hose, so as to avoid the accident that the shower falls off from the base and accidentally injures the child, as shown in FIG. 8 and FIG. 9 of the description. When the shower 100 is to be removed, simply hold the handle of the shower and swing it backward and downward, or parallel to the magnetic surface to remove the shower, as shown in FIGS. 10 and 11, 12 and 13 of the attached description, and the principle is that the upper end face of the depression 130 is in an inclined shape that gradually expanding from the inside to the outside, and when the shower 100 is pulled out, the bending part 221 can slide out along the inclination of the upper end face of the depression 130, and under the action of the spring 232, the elastic buckle 220 is recovered, so that the shower 100 can also be pulled out parallel to the magnetic surface. of course, when adjusting the direction of the water outlet, the user only needs to hold the handle of the shower and apply a little force downward and swing to adjust the positional relationship between the ball head 400 and the base 200. At the same time, people who need high-altitude shower only need to separate the shower 100 from the base 200 and insert it separately into the socket 300 on the base 200 to realize high-altitude shower, as shown in FIG. 14 of the description.

The above description shows and describes the preferred embodiments of the present invention. As mentioned above, it should be understood that the present invention is not limited to the form disclosed herein, and should not be regarded as the exclusion of other embodiments, but can be used for various other embodiments. Combinations, modifications and environments can be modified through the above teachings or technology or knowledge in related fields within the scope of the inventive concept described herein. The modifications and changes made by those skilled in the art do not depart from the spirit and scope of the present invention, and should fall within the protection scope of the appended claims of the present invention.

What is claimed is:

1. A shower device, comprising a shower and a base, wherein the base is provided with a convex boss, the back of the shower is provided with a groove matching the convex boss, and the base is also provided with an elastic buckle, the shower is provided with a clamping slot that can be matched and clamped with the elastic buckle, and a socket for hooking up the shower is also provided on the base:

the back of the shower is provided with a first magnetic surface, and the base is provided with a second magnetic surface that matches with the first magnetic surface;

the convex boss is arranged on the second magnetic surface, and the groove is arranged on the first magnetic surface;

a protrusion part is provided on the first magnetic surface, a depression is provided in the middle of the protrusion part, and the depression forms the clamping slot;

the upper end face of the depression is in an inclined shape that gradually expanding from the inside to the outside.

2. The shower device as claimed in claim 1, wherein the base comprises an elastic buckle support, a sliding groove is arranged on the elastic buckle support, the elastic buckle is matched with the sliding groove, and a spring is also arranged between the elastic buckle support and the elastic buckle.

3. The shower device as claimed in claim 2, wherein the elastic buckle is also provided with a bending part, and the bending part is matched and clamped with the clamping slot.

4. The shower device as claimed in claim 2, wherein the elastic buckle support is also cooperatively connected with a magnet upper disk, and a second magnetic member is arranged in the magnet upper disk.

5. The shower device as claimed in claim 1, wherein the back of the shower is provided with a depression, the depression is cooperatively connected with a magnet lower disk, the magnet lower disk is provided with a first magnetic member, and the groove and clamping slot are arranged on the magnet lower disk.

6. The shower device as claimed in claim 1, wherein the socket is provided at the side end of the base.

7. The shower device as claimed in claim 2, wherein the base is also matched and connected with a ball head.

* * * * *